Sept. 1, 1959  A. TALALAY  2,901,773
IMPROVED FOAM RUBBER MOLD
Filed May 8, 1956  2 Sheets-Sheet 1

INVENTOR.
ANSELM TALALAY
BY James R. Lindsay
ATTY.

Sept. 1, 1959 A. TALALAY 2,901,773
IMPROVED FOAM RUBBER MOLD
Filed May 8, 1956 2 Sheets-Sheet 2

INVENTOR.
ANSELM TALALAY
BY James R. Lindsay
ATTY.

United States Patent Office 2,901,773
Patented Sept. 1, 1959

2,901,773

AN IMPROVED FOAM RUBBER MOLD

Anselm Talalay, New Haven, Conn., assignor to The B. F. Goodrich Company, New York, N.Y., a corporation of New York Application May 8, 1956, Serial No. 583,516

2 Claims. (Cl. 18—39)

This invention relates to the molding of foam rubber articles, and pertains more particularly to a foam rubber article having cavities or cored portions formed therein, such as furniture cushions, automobile seat cushions, mattresses and the like, and to a mold in which foamed rubber can be shaped into a product of the desired structure and configuration.

Foam rubber furniture cushions, automobile seat cushions, mattresses and other foam rubber articles of a similar nature are made of one or more foam rubber sections which usually are formed in a mold either by completely filling the mold with a frothed or foamed latex composition and coagulating and vulcanizing the foamed latex or by only partially filling the mold with an unfoamed latex composition and expanding or foaming the latex composition in the mold followed by coagulation and vulcanization of the expanded latex. Coagulation of the foamed latex may be effected by adding a delayed action coagulant to the latex composition or by freezing the foamed latex in the mold and forcing a coagulating gas through the frozen latex as described in United States Patent 2,432,353.

The molded foam rubber sections usually are formed with cavities or cored portions which extend partially through the thickness thereof and which generally are uniformly spaced with respect to adjacent cored portions. Two-part sectional molds are most commonly used for molding the foam rubber sections and one or both parts of the mold are provided with cores or projections referred to as "pins" which project interiorly into the mold cavity and cause the formation of the cavities or cored portions in the molded product. Coring the foam rubber sections is advantageous in that coring not only reduces the weight of the structure with an attendant savings in material but also increases the mold surface in contact with the foamed latex in the mold thereby increasing the rate of heat-transfer between the foamed latex and the mold facilitating freezing and/or heating the foamed latex in the mold during the manufacture of the molded product.

The foam rubber sections are removed from the molds after the foamed latex has been vulcanized and the molded sections are washed and dried. When the final product is formed of two or more foam rubber sections, the sections are assembled and adhered together with a suitable adhesive to form the final structure.

In such products as mattresses, furniture cushions, automobile seat cushions and the like, it usually is desirable that the marginal areas of the constructions be firmer and thereby capable of supporting greater loads than other areas of the structure. If cavities or cored portions of conventional shape are formed in such marginal areas close to the edges of the structure, the marginal areas do not have the desired firmness. Consequently, it has been considered necessary that the marginal areas of such products be formed of uncored material if a firm border edge is to be obtained. However, the absence of coring in the areas of the molded foam rubber sections which form the marginal areas of the finished product creates difficulties in the manufacture of the foam rubber sections since the uncored areas require a longer time to vulcanize than the cored areas of the foam rubber sections and, as a result, the foam rubber of the article is not vulcanized uniformly. Furthermore, if the foamed rubber is to be frozen during the coagulation process, a longer time is required to freeze the uncored areas as compared to the cored areas of the foam rubber molding whereby the cost of manufacturing the product is increased.

The present invention provides a mold having novel coring pins of a configuration which permits the marginal areas or other areas of such products as foam rubber mattresses, furniture cushions, automobile seat cushions and the like to be cored without encountering the difficulties heretofore experienced in manufacturing such products. The novel coring pin used in this invention is a hollow tubular member having an open end which projects into the cavity of the mold. The foamed latex flows into and fills the hollow interior of the pin when the mold is filled forming a cavity or cored portion in the foam rubber article having a shape corresponding to the hollow configuration of the pin. The areas of the foam rubber article cored with the novel coring pins used in this invention are firmer than if such areas were cored with pins of conventional design, and freezing and/or heating of such areas during the manufacture of such articles can be accomplished more rapidly than if such areas were not cored because the mold surface in contact with the foamed rubber of such areas is larger when such areas are cored than when no coring is effected and heat therefore is more effectively transferred between the mold and the foam rubber.

The invention will be more fully understood by referring to the accompanying drawings, however it will be understood that this invention is not intended to be limited to the embodiments shown in the drawings.

Figure 2:
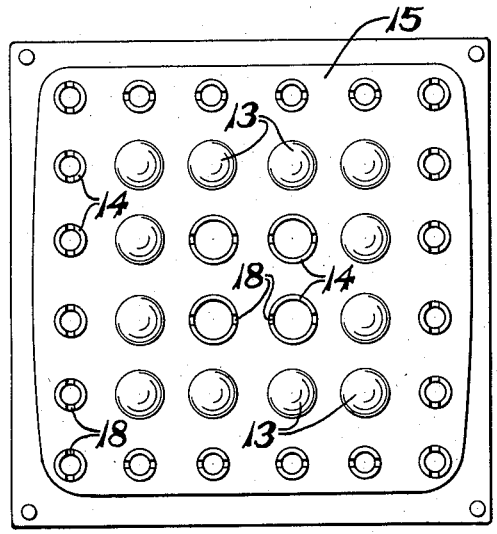
Fig. 2 is a bottom plan view of the upper mold section of the mold shown in Fig. 1.

Referring to the drawings, mold 10 is a two-part sectional mold comprising an upper mold section 11 and a lower mold section 12. The walls of mold sections 11 and 12 may be of a hollow construction (not shown) to allow a cooling or heating fluid to be circulated within the walls of the mold sections to facilitate freezing and/or vulcanizing the foamed rubber being molded. Any means may be employed for holding the mold sections in the proper closed position during the molding operation, although usually the mold sections are pivotally hinged together and suitable means are provided for insuring that the mold sections are locked in the closed position when the mold is in use. The mold also usually has a sealing element positioned between the mating surfaces of the mold sections to prevent loss of the molding composition through the juncture between the mold sections when the mold is in a closed position. Since the various devices for holding such molds closed and the means for sealing between the mating surfaces of the mold sections are well known and are not essential features of this invention, they have not been shown in the drawings.

Figure 1:
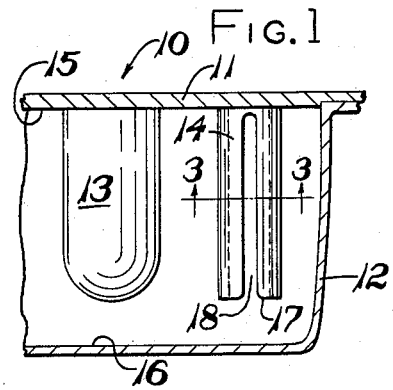
Fig. 1 is a side elevational view partly broken away and in section of a two-part sectional mold showing one embodiment of this invention.

As shown in Figs. 1 and 2, upper mold section 11 of mold 10 is provided with pins 13, 13, 14, 14, which project from the bottom face 15 of mold section 11 into the mold cavity of the mold when the mold is closed, and form the cavities or cored portions in the molded foam rubber article. Pins 13, 13, 14, 14, are arranged in a systematic pattern generally in aligned or staggered rows (Fig. 2 showing pins 13, 13, 14, 14, in aligned rows), and may be fastened to mold section 11 in a conventional manner such as by welding or bolting the pins to the bottom face 15 of the mold section.

Figure 3:
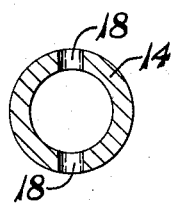
Fig. 3 is a section on the line 3—3 through the novel core pin shown in Fig. 1.

Pins 13, 13, which are of conventional design and form a cavity corresponding in shape to the external surface of the pin are used for coring those areas of the foam rubber article in which normal firmness is desired whereas hollow pins 14, 14 are used for coring those areas of the foam rubber article in which greater firmness is desired than is obtained when coring is effected with pins of conventional construction. It is essential to this invention that pins 14, 14 used for coring areas in which greater firmness is desired than is obtained when coring with conventionally shaped pins be hollow and have at least the end which projects furthermost into the mold cavity open, and that pins 14, 14 project only part way through the mold cavity of mold 10 and do not extend to or through the top face 16 of mold section 12. Preferably pins 14, 14 are of thin-walled construction, the wall thickness desirably not exceeding about ¼ of the cross-sectional diameter of the pin, and have a uniform wall thickness. As shown in Figs. 1, 2 and 3, each pin 14 is a thin-walled hollow cylinder open-ended at the end 17 which projects furthermost into the mold cavity of mold 10 and has slots 18, 18 through the wall thereof which connect with the hollow interior of the pin and extend upwardly from the edge of end 17 of pin 14 toward the bottom face 15 of mold section 11. Although slots 18, 18 may extend to the bottom face 15 of mold section 11, it is preferable that slots 18, 18 extend only part way along pin 14 terminating short of the bottom face 15 of mold section 11 so that pin 14 has greater structural strength. While each pin 14 is shown with two slots 18, 18, it will be understood that a single slot or more than two slots may be used, although normally not over six slots should be used in a pin to insure that the pin has sufficient structural strength. Slots 18, 18 allow air, which otherwise would be entrapped in the hollow interior of pin 14 when the mold is filled with foamed rubber, to escape and thereby permit the hollow interior of pin 14 to be filled with foamed latex when the mold is filled. Normally pins 13, 13 and pins 14, 14 project the same distance into the mold cavity of mold 10, although if the edges of the foam rubber article are rounded it may be desirable that pins 14, 14 for coring the marginal area of the article, or at least the row of pins 14, 14 bordering the perimeter of the mold cavity if more than one bordering row of pins 14, 14 are used, not extend as far into the mold cavity of mold 10 as the other pins of the mold. However, in some instances it may be desirable to extend pins 14, 14 further into the mold cavity than pins 13, 13. The cross-sectional diameter of pins 14, 14 may be equal to, greater than or less than the cross-sectional diameter of pins 13, 13. It will be apparent that the cavities or cored portions formed by pins 14, 14 in the foam rubber article will have a configuration the same as the shape of hollow pins 14, 14 instead of the shape of merely the external surface of the pins realized when pins of conventional design are used. Pins 14, 14 may be used for coring any area of a foam rubber article where greater firmness is desired than is effected if such area were cored with pins of conventional design. When pins 14, 14 are used for coring the marginal area of a foam rubber article, the marginal area can be cored to within about one inch of the edge of the article. As shown in Fig. 2, pins 14, 14 are used to core the marginal area and the center area of a foam rubber article formed in mold 10.

Figure 6:
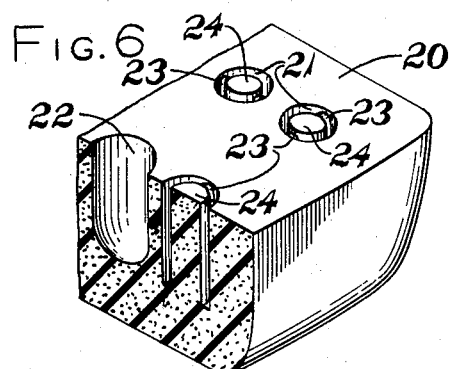
Fig. 6 is a perspective view partly broken away and in section of a foam rubber article molded in the mold shown in Fig. 1.
Figure 8:
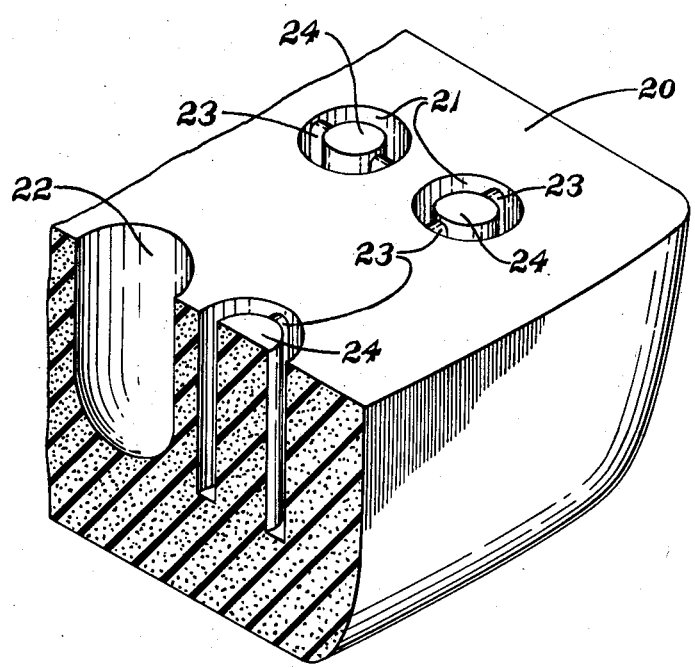
Fig. 8 is an enlarged view of Fig. 6.

A foam rubber article 20 formed in mold 10 is shown in Figs. 6 and 8. Cavities 21, 21 were cored with pins 14, 14 of mold 10 while cavity 22 was cored with a conventionally shaped pin 13. As is shown, each cavity 21 has essentially the same shape as the pin 14 which formed the cavity and consists of a generally annular cylindrical opening interrupted by webs 23, 23 of foam rubber extending parallel to the longitudinal axis of the opening and connecting the foam rubber externally adjacent to cavity 21 with the core 24 of foam rubber bounded by cavity 21, and each cavity 22 formed by pins 13, 13 have the shape merely of the external surface of pins 13, 13.

Figure 4:
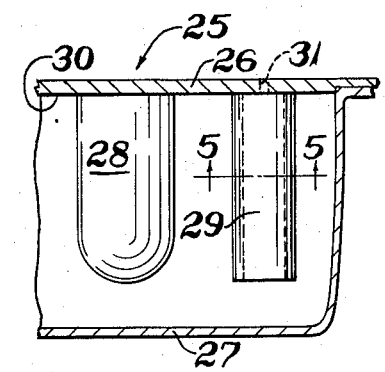
Fig. 4 is a side elevational view partly broken away and in section of a two-part sectional mold showing a second embodiment of this invention.
Figure 5:
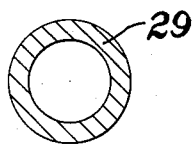
Fig. 5 is a section on the line 5—5 through the novel core pin shown in Fig. 4.

Fig. 4 shows a two-part sectional mold 25 having an upper mold section 26 and a lower mold section 27 and having pins 28, 29 projecting from the bottom face 30 of upper mold section 26 into the mold cavity of mold 25. In this embodiment of the invention pins 29, which are arranged in the same pattern as pins 14, 14 shown in Fig. 2, are the same as pins 14, 14 except that slots 18, 18 through which air entrapped in the hollow interior of the pin can escape when the mold is filled with foamed rubber are not provided. Instead, a venting valve 31 (which may be merely an opening in upper mold section 26) connecting into the hollow interior of the pin and to the atmosphere is associated with each pin 29 and allows air which otherwise would be entrapped in the hollow interior of the pin when the mold is filled to escape whereby foamed rubber fills the hollow interior of pin 29 when mold 25 is filled with foamed latex. In all other respects mold 25 is the same in construction as mold 10.

Figure 7:
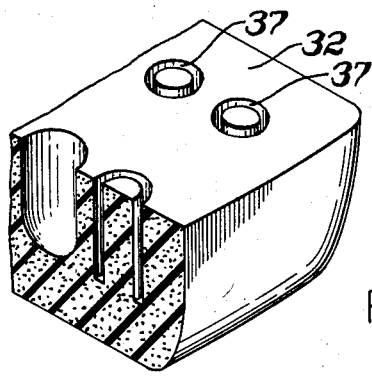
Fig. 7 is a perspective view partly broken away and in section of a foam rubber article molded in the mold shown in Fig. 4.

As shown in Fig. 7, a foam rubber article 32 made in mold 25 has annular cylindrical shaped cavities 37, 37 which are the same shape as pins 29 which formed the cavities.

While the novel hollow open-ended coring pins used in this invention may be used for coring only restricted areas of a foam rubber article (other areas of the article being cored with pins of conventional design) as illustrated above, it will be understood that the hollow open-ended coring pins can be used in coring the entire cored area of the article. It is further understood that obvious variations and modifications of this invention may be made without departing from the spirit and scope of the invention as defined in the appended claims.

I claim:

1. A mold comprising a pair of separable mold sections which define a mold cavity for shaping articles therein when said mold is closed, at least one of said mold sections having affixed thereto a plurality of coring pins which project into said mold cavity and terminate short of the inner face of the mold section opposing said pins when the mold is closed, said pins being hollow and having the ends thereof which project furthermost into said mold cavity open whereby molding composition introduced into said mold cavity can flow into the hollow interior of said pins, and each said pin having at least one slot through the wall thereof extending parallel to the longitudinal axis of said pin from the said open end of the pin toward the surface of the mold section to which said pin is affixed whereby air is vented from the hollow interior of said pin when molding composition flows into the hollow interior of said pin during the filling of the mold.

2. A mold comprising a pair of separable mold sections which define a mold cavity for shaping articles therein when said mold is closed, at least one of said mold sections having affixed thereto a plurality of coring pins which project into said mold cavity and terminate short of the inner face of the mold section opposing said pins when the mold is closed, said pins being hollow thin-walled cylinders with the ends thereof which project furthermost into said mold cavity being open whereby molding composition introduced into said mold cavity can flow into the hollow interior of said pins, and each said pin having at least one slot through the wall thereof extending parallel to the longitudinal axis of said pin from the said open end of the pin toward the surface of the mold section to which said pin is affixed whereby air is vented from the hollow interior of said pin when molding composition flows into the hollow interior of said pin during the filling of the mold.

References Cited in the file of this patent

UNITED STATES PATENTS

| | | |
|---|---|---|
| 1,590,138 | Wagenhorst | June 22, 1926 |
| 2,364,036 | MacKay et al. | Nov. 28, 1944 |
| 2,587,413 | Vander Heyden | Feb. 26, 1952 |
| 2,588,823 | Glassman | Mar. 11, 1952 |
| 2,619,659 | Futterknecht | Dec. 2, 1952 |
| 2,684,518 | Whitlock | July 27, 1954 |
| 2,691,191 | Butsch | Oct. 12, 1954 |
| 2,728,126 | Whitlock | Dec. 27, 1955 |
| 2,752,635 | Miller | July 3, 1956 |
| 2,797,442 | Wagner | July 2, 1957 |
| 2,804,650 | Kunce | Sept. 3, 1957 |